Patented May 19, 1931

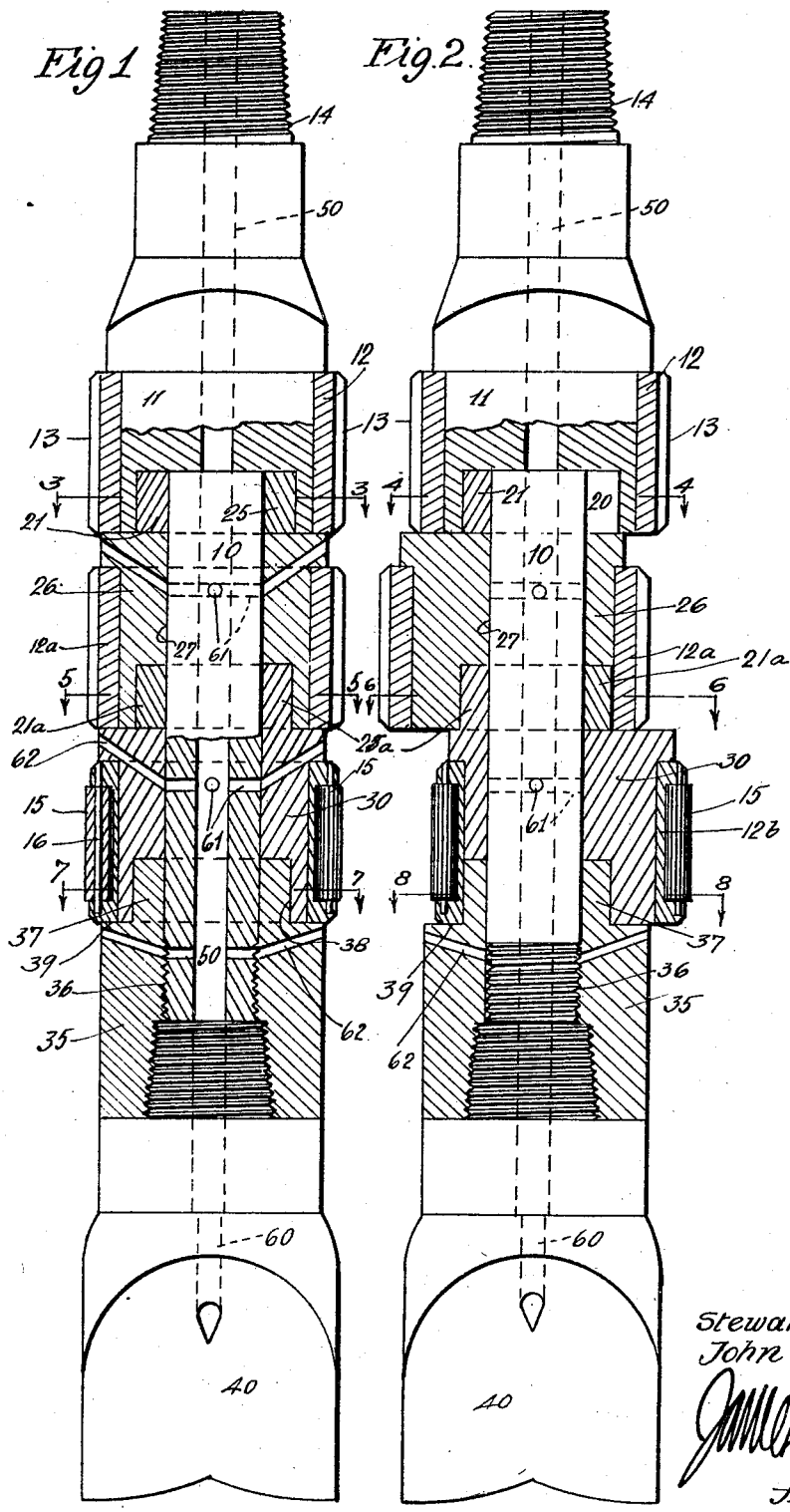

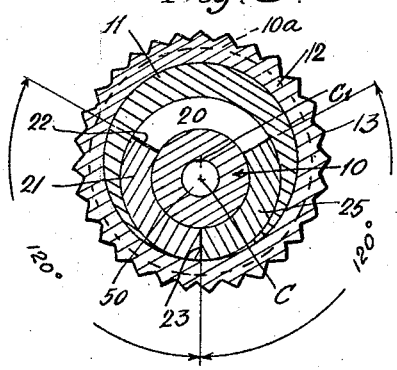
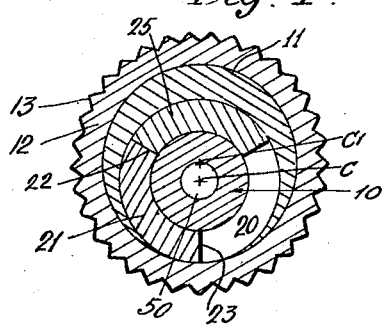
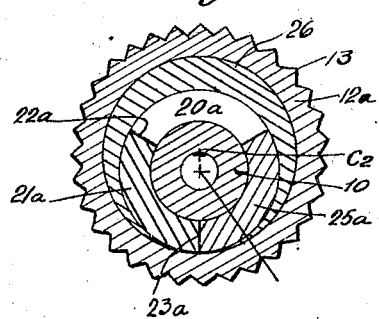
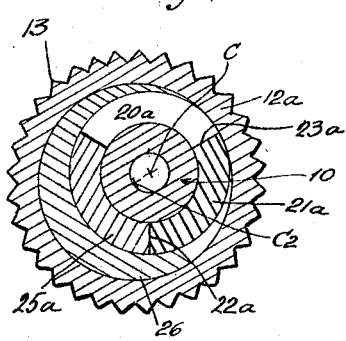
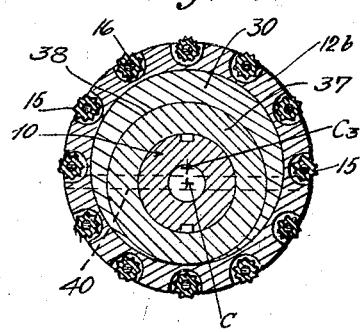
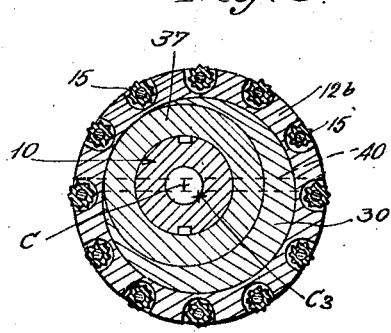

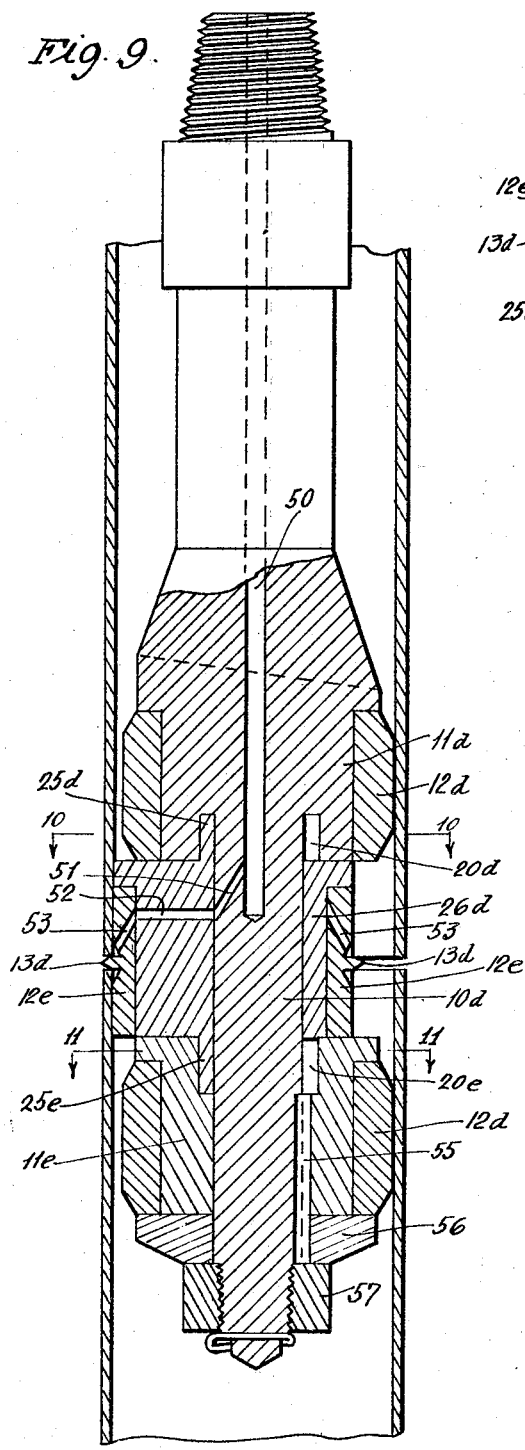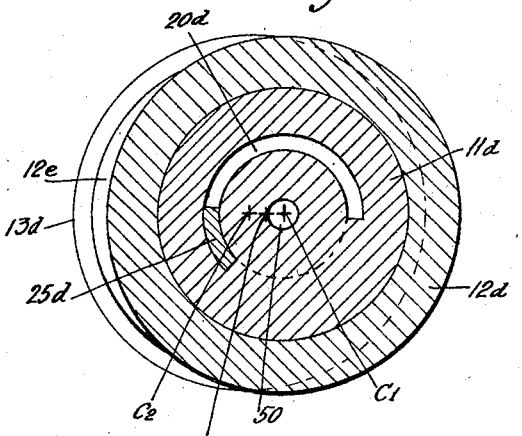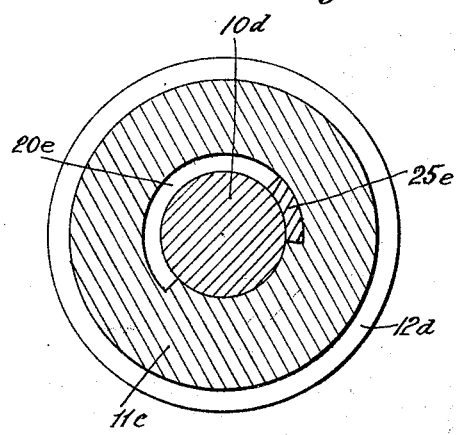

1,805,806

UNITED STATES PATENT OFFICE

STEWART L. CAMPBELL, OF BERKELEY, AND JOHN GRANT, OF LOS ANGELES, CALIFORNIA; SAID CAMPBELL ASSIGNOR TO SAID GRANT

EXPANDING REAMING OR CUTTING TOOL

Application filed March 7, 1930. Serial No. 434,034.

This invention has to do with expanding cutting tools, such as expansive reamers for wells. The invention, however, is applicable to other uses, such as pipe cutting, and will be explained in detailed and illustrative designs as applied to both expansive reaming and to internal pipe cutting.

A general object of the invention is the provision of an expansive tool, simple and strong in design, and which is expanded by rotation in one direction and contracted by relative rotation of the parts in the opposite direction. In its major features, the tool embodies a central mandrel upon which a plurality of cutter-carrying eccentrics are mounted, each eccentric being relatively (to another eccentric) rotatable within certain limits. The limits of relative rotation are set by stops which interact between adjacent relatively rotatable eccentrics; so that the second eccentric in a series has a certain angular rotation with reference to the first eccentric of a series; and the third eccentric of a series has also a certain relative angular movement with relation to the second of the series. Thus the last eccentric of a series can have a considerable rotation with reference to the first, while at the same time the limiting stops, which are of course limited in angular extent to the difference between 360° and the relative angular rotation between any two adjacent eccentrics, may be made heavy and strong. And with such a structure the several eccentrics of a series, being relatively rotatable through comparatively large angles, can be thrown to any desired angular relationship, such for instance that cutters carried by the eccentrics may be put in efficient angular relationships for reaming, or such as that the pipe cutters and the associated back-bearing elements may be put in proper relationships to perform efficient pipe cutting. These features, and others, of the invention will be best understood from the following detailed and specific description of illustrative embodiments of the invention shown in the accompanying drawings, in which:

Figure 1 is a longitudinal central section of our invention in the form of an expansive reamer, in contracted position;

Fig. 2 is a similar view showing the expanded position;

Fig. 3 is a cross-section on line 3—3 of Fig. 1;

Fig. 4 is a corresponding cross-section on line 4—4 of Fig. 2;

Fig. 5 is a cross-section on line 5—5 of Fig. 1;

Fig. 6 is a corresponding cross-section on line 6—6 of Fig. 2;

Fig. 7 is a cross section on line 7—7 of Fig. 1;

Fig. 8 is a corresponding expanded cross-section on line 8—8 of Fig. 2;

Fig. 9 is a central vertical section showing our invention applied as a pipe cutter, in the expanded position;

Fig. 10 is a cross-section on line 10—10 of Fig. 9; and

Fig. 11 is a cross-section on line 11—11 of Fig. 9, but showing the parts in contracted position.

Referring first to Figs. 1 to 8, a suitable internal mandrel 10 is illustrated, cylindric in form, and having at its upper end an eccentric 11 which may be considered as affixed to or as a fixed part of the mandrel 10. In fact the lower cylindric portion of the mandrel and eccentric 11 may be made as an integral piece; and this same mandrel has at its upper end a tool joint member 14 for connection with a rotating drill pipe. Eccentric 11 is offset from the mandrel center, as will best be seen from an inspection of Fig. 3, where the mandrel center is indicated by the letter C and the center of eccentric 11 is indicated by C1.

In the specific illustrative form herein set out, this uppermost eccentric 11 carries a roller cutter 12, which is in the form of an annulus rotatable upon the eccentric as a bearing; and this cutter annulus may have suitable cutting teeth 13 on its periphery. It will be understood, however, that this eccentric 11, and likewise the other relatively rotatable eccentrics hereinafter to be described, may carry the ultimate cutting elements or members in other manners. For instance, if it not be desired to utilize roller cutters, or roller cutters of large diameter, then the cutting teeth 13, or their equivalents, may be non-rotatably carried by the eccentrics. This situation may be easily visualized merely by supposing annulus 12, instead of being rotatably mounted on eccentric 11 as a bearing, to be tightly fitted upon eccentric 11 so as to become functionally a part of the eccentric. Then cutting teeth 13 will rotate with the eccentric and with the rotation of the whole tool. And it will be readily understood how other forms of ultimate cutting elements may be substituted for cutting teeth 13, either to revolve about the eccentric as a bearing or to rotate with the eccentric and with the whole tool. For instance in Figs. 7 and 8, which show the lowermost eccentric and cutter, we have shown small roller cutters 15 mounted on vertical axes 16 in the annulus 12b, which annulus may be either rotatable upon its eccentric or rotatively fixed thereon.

Uppermost eccentric 11 has a circular stop receiving recess 20 extending up into it from its lower surface. This circular recess 20, in the specific formation being herein set forth, is not of fully circular extent. A convenient manner of forming this recess is first to cut upwardly into eccentric 11 a complete circular recess around the cylindric mandrel 10, and concentric with the mandrel and with its center C, and then to fill up this recess, to the angular extent of 120°, with a filler block 21, which may be welded or otherwise secured in place. With a filler block so inserted, and virtually forming an integral part of the body of eccentric 11, the circular recess 20 becomes one of 240° angular extent, ending at the stop shoulders 22 and 23.

Into the 240° recess 20 of the upper eccentric 11, a stop lug 25 extends upwardly from the next eccentric 26 of the series, the stop lug being formed integrally with eccentric 26, as is plainly shown in Fig. 1. This stop lug 25 is, in this particular embodiment of the invention, also of 120° angular extent; so that its limit of angular motion in recess 20, and therefore the limit of angular motion of the second eccentric 26 with relation to the first eccentric 11, is 120°.

The second eccentric 26, like the first eccentric 11, may carry a cutter or cutters of any desired type. The annulus 12a is illustrated, which may be like the annulus 12 as hereinbefore described and explained. This second eccentric 26 has rotational bearing throughout most its length, as indicated at 27, upon the cylindric mandrel 10. In its lower part it has a circular recess 20a like the recess 20 hereinbefore described, which may be formed in the same manner, with the filler block 21a forming the end shoulder surfaces 22a and 23a of the stop receiving recess 20a which, like the one before described, is in this particular embodiment of the invention also of 240° angular extent. In the contracted position of the second eccentric 26, with its stop lug 25 in the relative position shown in Fig. 3, the center of eccentric 26 is at such a point as is indicated at C2 in Fig. 5, directly in longitudinal alinement with the center C1 of the first eccentric 11. Consequently, in such relational position of the two eccentrics, the cutters carried by those eccentrics will be longitudinally alined.

Below the second eccentric 26 there is shown a third cutter carrying eccentric 30 similar to the second eccentric 26; and the stop lug 25a of eccentric 30 projects up into the circular recess 20a of eccentric 26. Thus, as will readily be seen without the necessity of further detailed description, eccentric 30 has the same relative angle of rotation with reference to eccentric 26 that eccentric 26 has with relation to the first eccentric 11. The third eccentric 30 is shown as carrying the cutter annulus 12b which has been before referred to.

Although a tool of the character here described may be formed of as many cutter carrying eccentrics as is desired, and the angular rotational relationship between the successive eccentrics of the series may be made as desired; for purposes of illustration here we have chosen to show three such cutter carrying eccentrics with relative angles of rotation of 120°. The third and last eccentric 30, as here shown, is confined longitudinally on the mandrel, and all of the eccentrics and cutters are held longitudinally on the mandrel, by a joint fitting 35 which is screw-threaded at 36 onto the lower end of the mandrel and which has a circular or annular extension 37 extending up into a fully circular recess 38 in the lower end of the lowermost eccentric 30; so that the lowermost eccentric 30 is not only held on the mandrel by this fitting, but this lowermost eccentric has rotational bearing on the mandrel and also on the extension 37. The upwardly facing shoulder 39 of fitting 35 is of sufficient radial extent that the cutter annulus 12b will always rest upon that shoulder for support. Similarly, the cutter annuli 12 and 12a rest upon the upper surfaces of the eccentrics 30 and 26 respectively.

In the normal or contracted position of lowermost eccentric 30, its center is at the point marked C3 in Fig. 7, in longitudinal alinement with center C2 of eccentric 26 and center C1 of eccentric 11; and the stop lug 25a of eccentric 30 is in the relative position shown in Fig. 5. By inspection of Figs. 3 and 5 it will readily be seen that the two lower eccentrics may be thrown to their normal contracted positions by relative right handed rotation about the mandrel (looking down on the eccentrics), or by, what amounts to the same thing, relative left handed rotation of the mandrel within the eccentrics. Correspondingly, relative right handed rotation of the mandrel within the eccentrics—in other words, relative left handed rotation of the eccentrics about the mandrel—will throw the second eccentric 26 around to the relative position shown in Fig. 6, when its stop lug 25 will be thrown to the relative position shown in Fig. 4. In this position the center C2 of eccentric 26 has been thrown around through an angle of 120°, to the position shown at C2 in Fig. 6. During this relative rotation of the second eccentric 26, the third eccentric 30 will be moved around with the second eccentric 26, and then continued relative rotation will move the third eccentric on around through an additional angle of 120°, or 240° in all, to the position where its center C3 is in the relative angular position shown in Fig. 8, and in which position the stop lug 25a of eccentric 30 is in the position of Fig. 6.

When the three eccentrics have reached these relative angular positions, it will be seen that their offset eccentric centers C1, C2 and C3 are equi-angularly spaced around the mandrel center C; and that therefore the several cutters carried by the eccentrics will be projected radially from the mandrel along lines or planes which are angularly spaced around the mandrel center. This particular equi-angular spacing of 120° of the eccentrics and cutters in the expanded tool is of course not a limitation upon the invention; other angular spacings and relative rotations may be adopted. The particular angles, and relative rotations, are illustrative only. But in any case where the cutter carrying eccentrics have been relatively rotated from a position in which all their centers are in alinement to positions in which their centers are out of alinement, it will be seen that the over-all diameter—the effective reaming or cutting diameter—of the tool is increased by an amount depending upon the distance of eccentric offset of the eccentric centers.

In this expanded condition of the cutters the tool will then ream a hole larger than that through which it can be passed when it is in the contracted position of Fig. 1. In the contracted position of Fig. 1, although the centers of all the eccentrics in contracted position are offset with relation to the mandrel center, it will be seen from an inspection of the drawings that, when contracted, the maximum diameter of the tool is the maximum diameter of any one cutter annulus 12, as all the cutter annuli are lined up with each other and project further outwardly than any other portion of the tool—or at least as far outwardly as any other portion. In Fig. 3 the outline of the enlarged mandrel head 10a is indicated in dotted lines. It may preferably be eccentric to the mandrel center C. In Fig. 7 the relative position of the fish tail bit 40 (which is attached to the lower fitting 35) is indicated in dotted lines. The plane of this fish tail bit is preferably at right angles to the axial plane which is determined by the mandrel center C and the eccentric centers when in their contracted positions; and, the maximum diameters of the cutter annuli being about the same as the maximum width of bit 40, it will readily be seen that with this relative arrangement the effective contracted diameter of the tool is not increased above the diameter of a cutter ring.

Although we have shown the upper eccentric 11 and referred to it as being fixed relative to the mandrel; it will be readily recognized that, with relation to the other eccentrics of the series, it is relatively rotatable; and it is the relative rotation between the several eccentrics that causes the expansive and contractive action of the tool. So far as relative rotation between the several eccentrics is concerned, it makes no difference whether one, or even more than one, of the eccentrics is fixed to the mandrel or not. However, it is convenient to make the uppermost eccentric fixed with relation to the mandrel—to form it as part of the mandrel.

A circulation bore 50 is extended through the mandrel and communicates with the circulation passage or passages 60 of the drill bit below. The main circulation bore 50 may also have side passages 61 which connect with passages 62 to discharge circulating liquid upwardly and outwardly under the cutters.

The fact that the cutter carrying eccentrics may be rotated through any desired relative rotational angle, and that a strong structure may be made (the stops may be heavy) although the relative angle of rotation is large, permits our tool to be readily applied in any situation where a large relative rotation is desired. This feature may be applied to a reamer to obtain relative expanded angles of 180°, with the cutters arranged opposite each other when expanded. But, for purposes of illustration, the feature here spoken of is shown applied to a pipe cutter. In Figs. 9 and following we have shown the adaptation of the tool to internal pipe cutting. Here a mandrel 10d is illustrated carrying a relatively fixed eccentric 11d at its upper end, the mandrel being adapted at its upper end for connection with a drill pipe or other rotating rod or shaft. The uppermost eccentric 11d carries the rotating annulus 12d which, in this case, is a rotating bearing ring. The underside of eccentric 11d has the circular recess 20d into which the stop lug 25d of the next eccentric 26d projects upwardly. Eccentric 26d carries the rotating cutter annulus 12e which, in this case, carries the annular pipe cutting knife 13d. A circulation passage 50 extends down through the mandrel, connecting with a lateral passage 51 leading out through the mandrel, to passage 52 leading through the eccentric, to a passage 53 in the cutter annulus which leads to the cutter; and thus lubricating fluid may be fed to the cutter.

The lower end of center eccentric 26d is provided with a stop lug 25e, similar in position and extent to the upper stop lug 25d and this stop lug 25e plays in a circular recess 20e in the upper part of lowermost eccentric 11e. The circular recess 20e is, in this case, the same as recess 20d, both in extent and in relative location. The section of Fig. 10 represents, as regards form and position, both the upper eccentric 11d and its recess 20d, and also the lower eccentric 11e and its recess 20e. Fig. 11 shows the lower recess and lug in the relative position opposite that shown in Figs. 9 and 10.

It will be remembered that, in describing the specific design shown in Figs. 1, etc., we have described a lowermost eccentric which has a total relative angular movement of 240° because the relative angular rotations between adjacent eccentrics in that case are each 120° and both are in the same relative direction. It will readily be seen, however, how the relative angular rotation between adjacent eccentrics in that case could be made 180°, and how, therefore, the total rotation of the lowermost eccentric could be made 360°. Such a total rotation of the lowermost eccentric would bring it back to a final position exactly the same as its initial position.

In the form of tool shown in Fig. 9, etc., it is desired that two of the eccentrics (the two which carry bearing rollers) shall, in the expanded condition of the tool, be each located with their centers 180° removed from the center of the cutter carrying eccentric. From what has been said it will readily be seen how the lowermost eccentric could be made to have a total rotation of 360°, while the second or center eccentric has a total rotation of only 180°. Such angles of rotation would throw the third or lowermost eccentric through a whole circle of movement back to its starting point. Consequently, as another variation of our invention, it is possible to make the lowermost or third eccentric fixed in position relative to the uppermost or first eccentric. This arrangement is shown in Fig. 9. Here the third or lowermost eccentric 11e is shown keyed, at 55, to the mandrel. It carries another bearing annulus 12d. The whole series of eccentrics, rollers and cutters, are held on the mandrel by a collar 56 which may be in turn held on the mandrel by a nut 57.

From the inspection of Fig. 10, and from consideration of the stated fact that the lower recess 20e and the expanded position of the lower stop lug 25e are the same as shown in Fig. 10, it will be seen that relative right handed rotation of the mandrel within the eccentric 12d will cause relative left handed rotation of the eccentric 12d and its cutter annulus 12e to the relative position shown in Figs. 9 and 10, with the stop lugs in the illustrated end of the recess (Fig. 10). In this position, the center C2 of cutter carrying eccentric 26e is in the position indicated in Fig. 10. The center C1 of both the eccentrics 11d and 11e is as indicated in Fig. 10, with relation to the center C of the mandrel, which is also indicated in Fig. 10. On 180° relative rotation of the central eccentric 26d, its center C2 will be carried from the position shown in Fig. 10 to a contracted position in which center C2 will be in longitudinal alinement with center C1, and the tool will, therefore, be contracted because all of its eccentrics, and bearing and cutter annuli, will be in longitudinal alinement with each other.

We claim:

1. In an expansive tool of the character described, a mandrel, a plurality of carrier eccentrics mounted on the mandrel, at least one of said eccentrics being rotatable on the mandrel and rotatable with reference to the remaining eccentrics, wall contacting elements carried by the several eccentrics, and stop means to limit the relative rotation between the eccentrics comprising recesses in some of the eccentrics and stop lugs on the others which enter said recesses.

2. In an expansive tool of the character described, a mandrel, a plurality of carrier eccentrics mounted on the mandrel, at least one of said eccentrics being rotatable on the mandrel and rotatable with reference to the remaining eccentrics, wall contacting elements carried by the several eccentrics in the form of annuli rotatable upon the eccentrics, and stop means to limit the relative rotation between the eccentrics comprising recesses in some of the eccentrics and stop lugs on the others which enter said recesses.

3. In a tool of the character described, an internal central mandrel, an eccentric at the upper end of the mandrel and relatively fixed thereto, said eccentric having in its lower surface a circular recess of an angular extent less than 360°, another eccentric rotatively mounted upon the mandrel below the first mentioned eccentric and having an upwardly extending stop lug extending into said recess and of less angular extent than the recess; so that the stop lug and recess form a rotation limiting device acting directly between the two eccentrics, and wall contacting elements carried by the eccentrics.

4. In a tool of the character described, a central longitudinal mandrel, three eccentrics mounted on said mandrel one above the other, the central eccentric being rotatable about the mandrel center relative to the other two, rotation limiting means acting directly between the central eccentric and each of the other two eccentrics, and wall contacting elements carried by each of the eccentrics.

5. In a tool of the character described, a central longitudinal mandrel, three eccentrics mounted on said mandrel one above the other, the central eccentric being rotatable about the mandrel center relative to the other two, rotation limiting means acting directly between the central eccentric and each of the other two eccentrics, wall contacting elements carried by uppermost and lowermost eccentrics, and a cutter carried by the central eccentric.

6. In a tool of the character described, a central longitudinal mandrel, three eccentrics mounted on said mandrel one above the other, the central eccentric being rotatable about the mandrel center relative to the other two, rotation limiting means acting directly between the central eccentric and each of the other two eccentrics, wall contacting elements rotatably carried by the upper and lower eccentrics, and an annular cutting element rotatably carried by the central eccentric.

In witness that we claim the foregoing we have hereunto subscribed our names this 31st day of January 1930, by JOHN GRANT, and 20th day of February, 1930, by STEWART L. CAMPBELL.

STEWART L. CAMPBELL.
JOHN GRANT.